United States Patent [19]

Gille et al.

[11] Patent Number: 4,585,980
[45] Date of Patent: Apr. 29, 1986

[54] WINDSHIELD WIPER CONTROL

[75] Inventors: Günther Gille, Sersheim; Horst Goertler, Sachsenheim; Anton Lill, Lauffen a. Neckar; Hans Prohaska; Horst Rachner, both of Bietigheim-Bissingen; Thomas Theurer, Pforzheim, all of Fed. Rep. of Germany

[73] Assignee: ITT Industries, Inc., New York, N.Y.

[21] Appl. No.: 565,058

[22] Filed: Dec. 23, 1983

[30] Foreign Application Priority Data

Dec. 24, 1982 [DE] Fed. Rep. of Germany ....... 3248118

[51] Int. Cl.⁴ ............................................... B60S 1/08
[52] U.S. Cl. .................................... 318/444; 318/443; 318/DIG. 2; 15/250 C; 15/250.16; 15/250.17
[58] Field of Search ......... 318/443, 444, 484, DIG. 2, 318/483; 15/250 C, 250.12, 250.13, 250.16, 250.17, 250.27

[56] References Cited

U.S. PATENT DOCUMENTS

| 3,721,878 | 3/1973 | Gumbert | 318/443 |
| 4,405,887 | 9/1983 | Tamura et al. | 318/54 X |

FOREIGN PATENT DOCUMENTS

| 2942739 | 5/1981 | Fed. Rep. of Germany | 15/250.12 |
| 57-66053 | 4/1982 | Japan | 15/250.27 |
| 1522822 | 8/1978 | United Kingdom | 318/443 |
| 1561394 | 2/1980 | United Kingdom | 318/443 |
| 1573900 | 8/1980 | United Kingdom | 318/443 |

*Primary Examiner*—William M. Shoop, Jr.
*Assistant Examiner*—Bentsu Ro
*Attorney, Agent, or Firm*—Donald J. Lenkszus

[57] ABSTRACT

A windshield wiper assembly comprising two windshield wipers each driven by a separate motor is described in which a control provides switching signals for switching on and off the wiper motors so as to achieve relatively smooth running of the wipers. In particular wiping areas one motor is continuously switched on and only the other motor, in dependence on the difference of the angular positions of the two wipers, is controlled such that collision of the wipers is prevented when the wiping areas overlap.

22 Claims, 4 Drawing Figures

1

WINDSHIELD WIPER CONTROL

BACKGROUND OF THE INVENTION

This invention pertains to a windshield wiper installation for motor vehicles.

From the German patent specification No. 713 388 a windshield wiper installation is known in which two wipers are each driven by one of two independent motors in pendulum-fashion between a parking position and a reversing position. The motor of the respective leading wiper is switched off when it arrives at a determined angular position and is only switched on again when the other wiper has reached the same position. Thus, the two independent motors can be synchronized for example, in the parking position and in the reversing position. The amount of control for a wiper installation of this kind is relatively small. However, this system can only be used when the wiping areas of these independently driven wipers do not overlap. Otherwise, a collision of the two wipers could occur when the wiping speeds differ considerably.

From the German specification OS No. 26 29 885, a wiper installation is known in which the two motors are controlled by a control device in a way that the two motors remain switched on as long as the wipers move substantially synchronously. However, the quicker motor is switched off until the motor of the slower wiper has reached a corresponding position. For this purpose, pulses released by angular-position-dependent sensors are conducted to two counter stages and the contents of the counters are compared in a comparator. It is, thereby, ensured that the wiping motions of the two wipers are substantially synchronized in the entire wiping area. However, the wipers only move without a jerking action, when a high resolution sensor is used which releases a pulse for the counter at small angular distances. In this case, the wipers are not really brought to a standstill, but only slow down. Such action is hardly noticed by an observer. If, however, a sensor is used which releases only a few pulses in the wiping area, the continuous switching-on and off and the corresponding stopping and starting will be noticed as very undesireable by an observer.

The use of a high-resolution sensor increases the costs of the wiper installation considerably. Opto-electronic transducers must be used because one cannot achieve a sufficient resolution by switching disks of usual size and contact springs sliding thereon.

Sufficient operating reliability is not ensured in the embodiment according to the German specification OS No. 26 29 885. When the supply voltage for the counters is switched off, then switched on again, the counters have a counter reading which does not correspond to the actual angular position. Such a discrepancy can also occur if one wiper is blocked and does not occupy its parking position when the wiper installation is switched off.

Additionally, in the system according to the German specification OS No. 26 29 885, wiper operation is not possible, if one of the two wipers are blocked. In this case, the other wiper will advance to an end position beyond the blocked wiper and then also be switched off.

SUMMARY OF THE INVENTION

It is an object of the invention to provide a windshield wiper installation having two wipers each being driven by a separate motor in pendulum-fashion between a parking position and a reversing position in which the wipers run without a jerking movement. It is a further object to provide such a system that can also be used with wiper installations having overlapping wiping areas.

The invention is thereby based on the consideration that it is not necessary to have a full synchronism over the entire wiping area, because during the major part of the operating time, the wiper speeds do not differ very much. Therefore, a motor can be switched on independently of the angular position of the two wipers in a given wiping area at least. In order to avoid a collision of the wipers, the motor of the other wiper has to be controlled in dependence on the difference of the angular positions of both wipers. In this manner, the number of switching-off actions is reduced, because in contrast to the known solution, one motor is not at all switched off in the defined wiping area.

In accordance with the invention, a particular wiping area, may be defined by two counter readings in which one wiper motor is continuously connected to the supply voltage, whereas, in the remaining wiper area the wiper motions are fully synchronous. According to an advantageous development of the invention, the frequency of switching-off actions can be further reduced, by defining a second wiping area in which the motor of the second wiper is continuously switched on independently of the angular position of the two wipers and only the motor of the first wiper is controlled in dependence on the difference between the angular positions.

In an advantageous embodiment, one wiping area comprises the wiper motion from the parking position to the reversing position, while the other wiping area comprises the return movement of the wipers from the reversing position to the parking position. To ensure that both wipers are in the same wiping area, the two motors are synchronized in the parking and/or reversing position.

This results in an embodiment in which during the advance movement, one wiper runs to its reversing position independently of the other wiper, while during the return movement, the second motor continues to be switched on independently of the angular position of the two wipers until the wiper has reached its parking position. During the advance movement, only the second motor can be switched off, while during the return movement only the first motor is switched off. In this case, the switching-off of the wiper motors is not directed to providing synchronism, but to prevent a collision of the two wipers when the wiping areas overlap. For this reason, the controlled wiper motor is only switched off when the wiper it drives approaches too close to the other independently controlled wiper. In practice, under usual operating conditions, the wiper motor is very rarely switched off outside the end positions, i.e., in the parking position or in the reversing position.

In the embodiment according to the invention, the operating reliability is at first improved in that a synchronism is ensured in the end positions. Furthermore according to an advantageous development of the invention, the angular position of the two wipers is checked before a wiping action is initiated. If the wipers do not occupy a defined initial position, for example, the parking position, they are displaced into the parking position before a wiping action is executed. In order to avoid a collision of the wipers during this introductory adjusting action the control provides that these wipers are separately and one behind the other brought into the parking position.

In wiper installations in which the wiping angles of the two wipers differ greatly, one of the two motors may be started earlier from the parking and/or reversing position. A timing element may provide this function. However, in a preferred embodiment one wiper is only started when the other wiper has already reached a given angular position. This also eliminates problems which may be created by the fact that, after switching-off of the motor, the parking position of the wiper depends on the frictional conditions on the window pane.

According to an advantageous embodiment of the invention, when one wiper is blocked, the motor of the other wiper continues to be controlled and this wiper is driven in pendulum-fashion in an angular area whose borders depend on the angular position of the blocked wiper. As far as a wiper installation is concerned in which the wiping areas do not overlap, when one wiper is blocked, the comparator circuit of the two counter readings is inhibited and only the other wiper motor is still controlled in continuous operation. If, however, a wiper installation with overlapping wiping areas is concerned, the wiping area of the non-blocked wiper is determined in a way that this wiper does not collide with the blocked wiper. This can be simply provided in wiper installations in which the wipers are driven by a reversible motor, because then the parking position and/or the reversing position can be determined by the counter reading which is available at the time the other wiper is blocked.

BRIEF DESCRIPTION OF THE DRAWINGS

The invention is hereinafter described in detail by way of an embodiment in which the direction of rotation of the wiper motors can be changed by a relay control. As will be evident to those skilled in the art, the invention can also be advantageously used in wiper installations of a kind in which the direction of rotation of the motor is not changed and the pendulum motion of the wipers derived from this rotary motion is realized via a pendulum-type gearing.

The invention will be better understood from a reading of the following detailed description in conjunction with the drawings in which.

DETAILED DESCRIPTION

Figure 1:
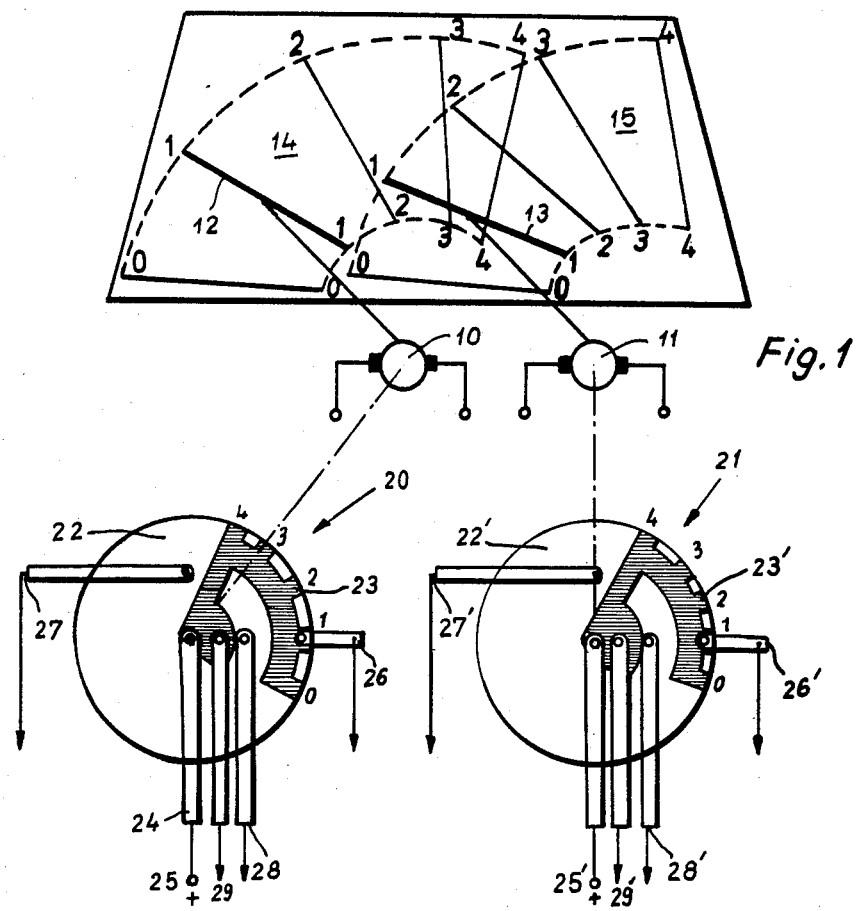
FIG. 1 is a schematic view of a wiping area comprising two wiper motors and assigned sensors for detecting the angular position of the wipers.

Two electric motors 10 and 11 are indicated in FIG. 1, which are controlled independently of each other and each of which drives a wiper 12 or 13. These wipers 12 and 13 move across the wiping areas 14 and 15 shown in FIG. 1, which wiping areas partially overlap. As FIG. 1 shows, these wiping areas are divided into particular zones by the lines 0 to 4. The parking position of the two wipers 12 and 13 is designated 0, the reversing position 4. One can see from the drawing that the line 1 limiting the zone for the wiper 12 ends before this wiper 12 enters a wiping area across which the other wiper 13 moves. Correspondingly, this is also applicable to the other zones, because it can be seen that the next zone for the wiper 12 up to the border line 2 is chosen in a way that this zone lies in the overlapping area with the first zone for the other wiper 13. The division of these zones and the purpose of this measure will be described in detail later. To each motor 10 or 11 is assigned a sensor 20 or 21. A switching disk 22 with a conductive contact path 23 on which several contact springs slide serves as a sensor. The contact path 23 is continuously connected via contact spring 24 to the positive pole 25 of a voltage source, not shown in detail. On the contact spring 26, pulses may be tapped off when the switching disk rotates. The arrangement is such that a pulse may be measured at the contact spring 26 at any time the corresponding wiper changes from one zone into another zone. The contact spring 27 carries positive potential when the wiper occupies the parking position. The contact spring 28, however, carries positive potential when the wiper occupies the reversing position. Contact spring 29 normally is connected with the positive pole 25 of the voltage source. Only in the case of trouble, when the wiper leaves the normal wiping angle area does contact spring 29 no longer rest on the contact path 23.

The sensors 20 and 21 are identical, however, the reference numerals of the sensor 21 are provided with a prime.

Figure 2:
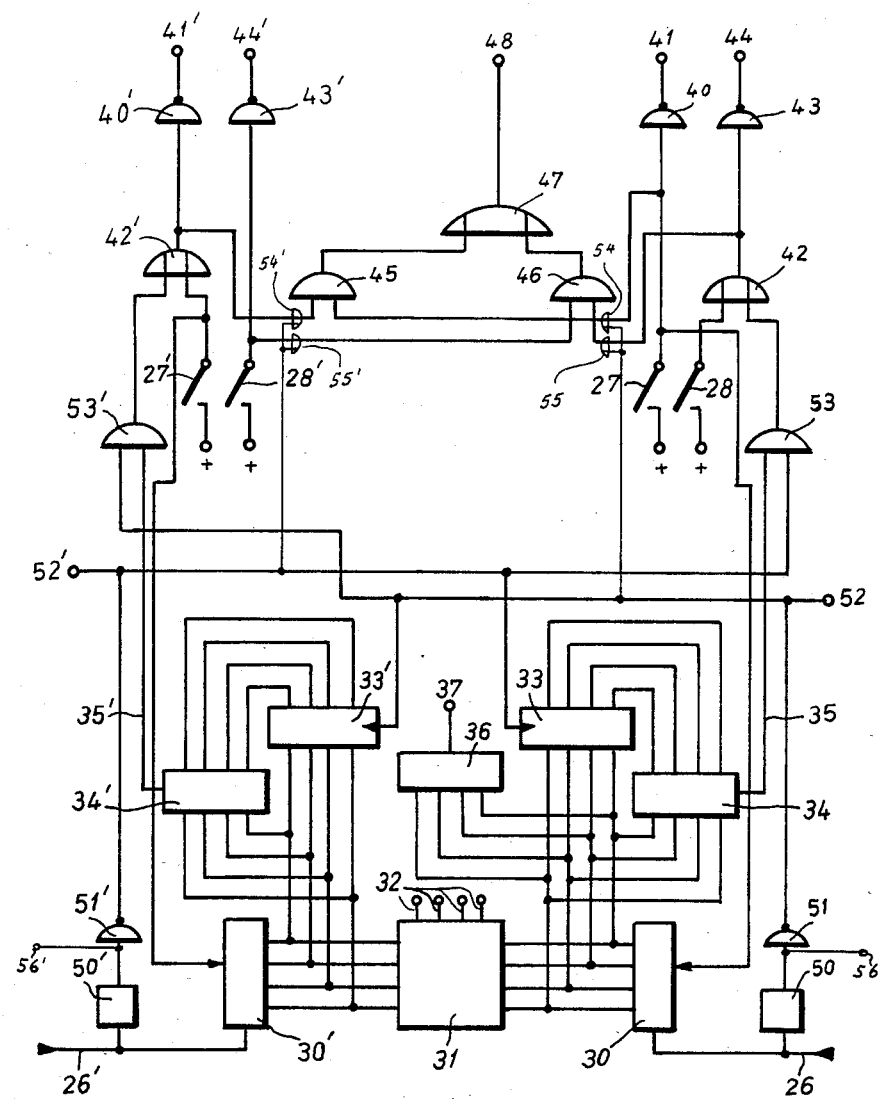
FIG. 2 is a circuit diagram of part of the control device, in particular comprising the elements which serve for the preparation of the sensor signals.

FIG. 2 shows a detailed circuit diagram of the control device for the wiper motors 10 and 11. To this control device, the signals of the sensors 20 and 21 are conducted. The pulse sequences at the contact springs 26 and 26' are conducted to counters 30 and 30', respectively. The outputs of counters 30 and 30' are coupled to a difference stage 31. At the output 32 of difference stage 31 a signal may be tapped off which corresponds to a difference determined by the angular position of the wiper 13 minus the angular position of the wiper 12. When the wipers 12 and 13 occupy the position shown in FIG. 1, the signal at the output of difference stage 31 is preset to a value corresponding to 0. However, if for example, the wiper 13 is in the angular position 1 while the wiper 12 still occupies the parking position 0, the output 32 of difference stage 31 provides a signal corresponding to the value 1.

The output signals of the counters 30 and 30' are respectively coupled to memories 33 and 33' and to comparators 34 and 34'. The readings of the counters 30 and 30' are respectively stored in the memories 33 and 33' at a given time. Then the comparators 34 and 34' respectively compare the values stored in the memories with the readings of the counters 30 and 30' and release a switching signal on the lead 35 or 35', when the respective counter readings match the readings stored in the memories.

The count output of counter 30 is additionally conducted to a decoder 36 which provides a signal at its output 37, only when the reading of counter 30 does not exceed a given value.

Contact springs 27 and 28, associated with wiper 12, and contact springs 27' and 28', associated with wiper 13, are shown schematically in FIG. 2.

Contact spring 27 controls the potential at node 41 via inverter 40. As long as wiper 12 is outside its parking position, node 41 is maintained at a positive potential.

When wiper 12 is in the parking position, contact spring 27 is coupled to positive battery and circuit node 41 is thereby maintained at ground potential.

Contact spring 28 controls the potential at node 44 via OR gate 42 and inverter 43 such that positive potential occurs at node 44 when wiper 12 is not in its reversing position. If wiper 12 is at its reversing position, ground potential occurs at node 44.

Contact spring 27' controls the potential at node 41' via OR gate 42' and inverter 40' such that positive potential occurs at node 41' as long as wiper 13 is outside its parking position. When wiper 13 is in the parking position, control spring 27' is coupled to positive battery and circuit node 41 is thereby maintained at ground potential.

Contact spring 28' controls the potential at node 44' via inverter 43' such that positive potential occurs at node 44' when wiper 13 is not in its reversing position. If wiper 13 is at its reversing position, ground potential occurs at node 44'.

AND gate 45 determines whether the two wipers are in their parking positions. AND gate 46 determines whether the two wipers occupy their reversing position. The output signals of the two AND gates 45 and 46 are coupled to OR gate 47. Output 48 of OR gate 47 is at positive potential when the two wipers either occupy the parking position or the reversing position.

The circuitry described so far serves to provide the basic functions of the present invention. Additional elements are provided for realizing certain advantageous features of the invention.

Pulses from contact spring 26 are further coupled to the input of retriggerable monostable 50. The output of monostable 50 is provided at node 56 and also is coupled via inverter 51 to node 52 and to a control input of memory 33'. Positive potential occurs at the output of monostable 50 when pulses from contact spring 26 are received within a predetermined time interval determined by the monostable 50. With node 56 at positive potential, node 52 is at ground potential.

If wiper 12 is blocked, pulses would not be received within the predetermined time interval. If a pulse is not received within the predetermined time interval, the monostable 50 changes its switching condition so that ground potential occurs at its output and accordingly positive potential occurs at node 52.

Then the memory 33' is triggered by the signal at the node 52 and the counter reading corresponding to the angular position of the wiper 13 is written in the memory 33'. In addition, one input of an AND gate 53' is controlled to which the output signal of the comparator 34' is also conducted. If the reading of counter 30' corresponds to the contents of memory 33', comparator 34' provides a signal on line 35' to AND gate 53'. OR gate 42' is controlled via the AND gate 53 and thus a switching signal is released which is of the same effect as the end position signal generated via contact spring 27' in the parking position of the wiper 13.

Similarly, pulses from contact spring 26' are further coupled to the input of retriggerable monostable 50'. The output of monostable 50' is provided at node 56' and is coupled via inverter 51' to node 52' and a control input of memory 33. The operation of the monostable 50' in conjunction with memory 33, comparator 34, AND gate 53 and OR gate 42 with respect to wiper 13 is identical to that described above. Thus, if wiper 13 is blocked, node 52' is at positive potential. Then, a signal is released via AND gate 53 and OR gate 42 which is of the same effect as the end position signal generated via contact 28 in the reversing position of wiper 12.

Thus, if one of the wipers is blocked, the end position signals of the blocked wiper which are normally triggered via the contact tongues 27 and 28 or 27' and 28' are replaced by the signal at the switching point 52 or 52' and conducted via the OR gate 54, 55 or 54' and 55' to the AND gates 45 or 46.

Figure 3:
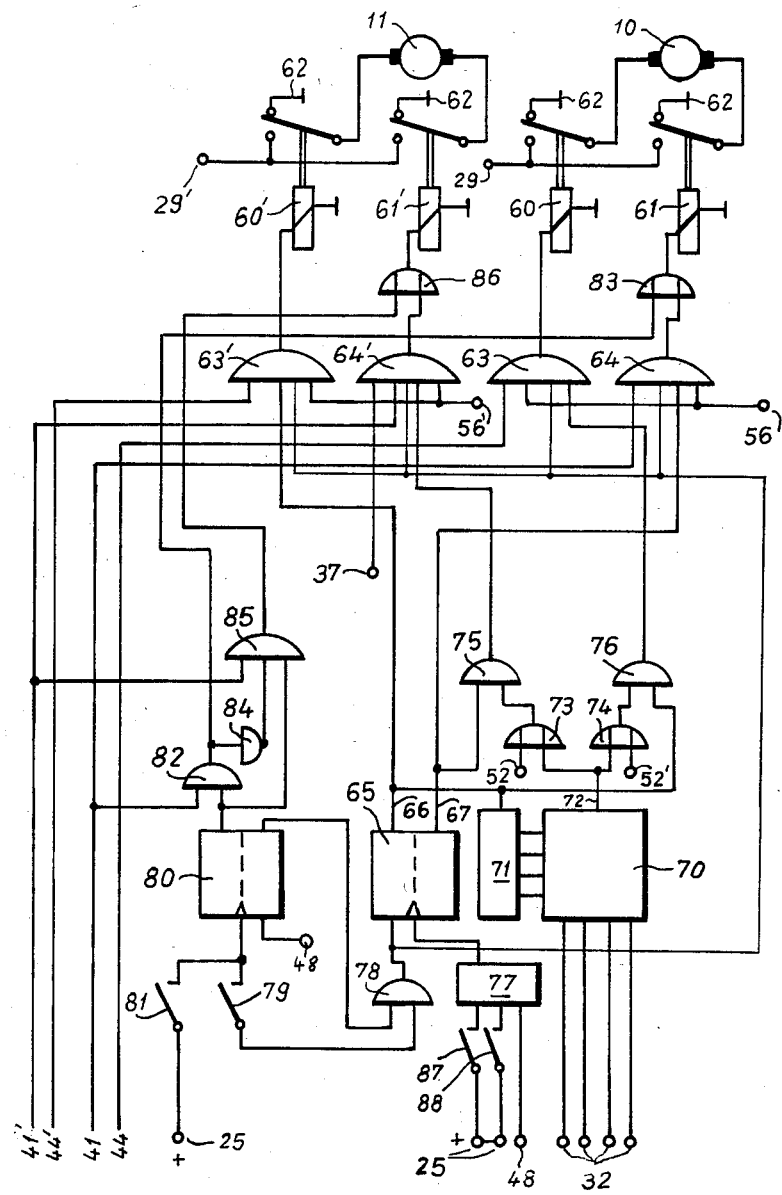
FIG. 3 is a circuit diagram of the part of the control device in which the signals for the control of the relays are produced.

FIG. 3 is a circuit diagram of that part of the control device through which the motors 10 and 11 are energized.

Two relays 60 and 61 are assigned to the motor 10 of wiper 12. Relays 60 and 61 connect the two motor terminals with ground potential 62 in the rest position shown. Thus, the motor 10 is short-circuited. In the operating position of the relay 60, one motor terminal is coupled to the contact spring 29 and thus to the positive pole of the voltage source, so that the motor 10 rotates in a particular direction of rotation. In contrast, when relay 61 is in the operating position, the other terminal of the motor is connected to the voltage source via contact spring 29, so that the motor rotates in the reverse direction of rotation. Relays 60' and 61' likewise control motor 11. The relays 60 and 61 are energized via AND gates 63 and 64. Relay 60' and 61' are energized via AND gates 63' and 64'. Signals from the circuit points 56 or 56' are respectively conducted to AND gates 63 and 64 or 63' and 64' so that the AND gates 63 and 64 or 63' and 64' are inhibited when the respective wiper is blocked. Thus blocking protection is provided for the wiper motors 10 and 11. Furthermore, a signal is conducted from gate 78 to all AND gates 63, 64, 63' and 64' which blocks these AND gates until the wiper installation is ready to operate.

A switching stage 65 with two outputs 66 and 67 is part of this control device. These outputs alternately carry positive potential and determine the direction of rotation of the wiper motors 10 and 11. If a positive signal is available at the output 66, the wipers shall advance in clockwise direction with reference to FIG. 1. Thus, the signal at the output 66 is therefore hereinafter designated on advance signal 11. If positive potential is available at the output 67, the wipers move in a counter-clockwise direction. The signal at the output 67 of the switching stage 65 is hereinafter designated the "return signal". The advance signal is directly conducted to one input of the AND gate 63', and the return signal is directly conducted to one input of the AND gate 64.

In FIG. 3 a comparator is designated 70, to which the signals at the output 32 of the difference stage 31 are conducted. Moreover, the signal of a limit value memory 71 is conducted to the comparator 70. The comparator compares the two signals and generates an error signal at its output 72 if the value of the difference stage 31 is equal to or smaller than the value provided by the limit value memory 71. The output 72 of the comparator 70 is connected to inputs of two OR gates 73 and 74. Furthermore, the signal from the circuit point 52 of FIG. 2 is conducted to the OR gate 73 and the signal from the circuit point 52' of FIG. 2 is conducted to the OR gate 74. The output of OR gate 73 is connected to one input of AND gate 75 which has its other input coupled to the return signal. The output of the OR gate 74 is connected to one input of an AND gate 76. The advance signal is coupled to the other input of AND gate 76. The output signal of the AND gate 75 is coupled to the AND gate 64', while the output signal of the AND gate 76 is coupled to one input of the AND gate 63. Furthermore, the end position signals from the circuit points 41 and 44 or 41' and 44' are also conducted to the AND gates 63 and 64 or 63' and 64'.

The switching stage 65 is a bistable flip flop whose trigger input is affected by a delay element 77. This delay element 77 has a trigger input to which the signal at the output 48 of the OR gate 47 of FIG. 2 is coupled. The set input of the switching stage 65 is controlled via an AND gate 78, to which the signal of an operating switch 79 and the output signal of a multivibrator 80 is conducted. This multivibrator 80 is part of a monitoring device which is activated via an ignition switch 81. If multivibrator 80 is set and the wipers are not in their parking position, the AND gate 82 is enabled by an output signal of the multivibrator 80 and the parking position signal at the circuit point 41 for the wiper 120. The output signal of the AND gate 82 directly affects the relay 61 via an OR gate 83 and relay 61 is therefore energized, so that the motor 10 moves the wiper 12 in counterclockwise direction into the parking position. Then the AND gate 82 is blocked and an AND gate 85 is controlled via an inverter 84. The parking position signal at the circuit point 41' of the other wiper 13 is conducted to AND gate 85. Furthermore, one input of AND gate 85 is connected with the output of the multivibrator 80. AND gate 85 energizes the relay 61' via an OR gate 86, so that the motor 11 in counterclockwise direction resets the wiper 13 into its parking position. When the wiper 13 also occupies its parking position, the multivibrator 80 is reset. For this purpose, the signal from the output 48 of the OR gate 47 of FIG. 2 is coupled to the reset input of the multivibrator 80. Then the condition of the multivibrator 80 can only be changed by actuating the ignition switch 81 again. Thus, this monitoring device with the modules 80, 82, 84, 85, 86 and 83 provides that each time before a wiping action is initiated, a check is first made to determine whether both wipers 12 and 13 occupy their parking position. If not, the wipers are returned separately into the parking position one behind the other. The wiper 12 advancing during the return movement is reset into the parking position before the retarded wiper 13. Thus, in systems with overlapping wiping areas, a collision of the wipers is prevented.

Also in FIG. 3 are two operating switches 87 and 88 through which the delay time of the delay element 77 can be effected as is described hereinbelow.

The functioning of this circuit will now be described in detail. Initially, an undisturbed operation is assumed and it is started with both wipers 12 and 13 occupying their parking positions. The ignition switch 81 is first switched on and the multivibrator 80 is thereby set. Because both wipers are in the parking position, ground potential may be measured at the circuit points 41 and 41'. Consequently ground potential is available at the output of the AND gate 82 and at the output of the AND gate 85, so that at first neither relay 61 nor relay 61' is energized. Multivibrator 80 is reset immediately after it has been determined that both wipers occupy a defined position, namely the parking position. Now the operating switch 79, which serves to switch on the wiper installation, is actuated with the consequence that the switching stage 65 is set via the AND gate 78, so that an advance signal appears at the output 66 of this switching stage. Furthermore, the AND gates 63, 64, 63' and 64' receive an enable signal via the AND gate 78 when the readiness for service of the system has been ascertained. During undisturbed operation, positive potential is also available at the circuit nodes 56 and 56', so the inputs of the AND gates controlled by those nodes need not be considered below. The AND gate 63' has one input enabled by the advance signal. At the other input of the AND gate 63', positive potential is also available, because the wiper 13 is not in its reversing position and thus positive potential may be measured at the circuit point 44'. Thereby the relay 60' is energized and the motor 11 is switched on. Motor 11 drives the wiper 13 from the parking position into the reversing position.

Before the wiping action begins both counters 30 and 30' have the value 0. Consequently, the output signal of the difference signal stage 31 is 0. In this embodiment, it has been assumed that in the limit value memory 71, the value −1 is stored. Because the other signal which is conducted to the comparator 70 is greater than −1, positive potential may be measured at the output 72. This means that the relay 60 is also controlled via the OR gate 74, the AND gate 76 and the AND gate 63 and thus the other wiper 12 is also moved out of its parking position. If the wiper motor 11 runs more quickly than the wiper motor 10, a positive potential occurs at the output of the difference stage as a result of a subtraction of the counter reading 30 from the counter reading 30'. Thus the relay 60 continues to be controlled and both motors 10 and 11 drive the assigned wipers into the reversing position in which the relays 60 and 60' are disconnected because positive signal is removed from the leads 44 and 44'. When both wipers have reached their reversing position, a reversing signal is generated at the circuit point 48 via the AND gate 46 and the OR gate 47. This reversing signal triggers the delay element 77. After expiration of the delay time of delay element 77, the switching stage 65 is triggered, so that now a return signal is generated at the output 67. Thereby, relay 61 is energized via the AND gate 64 and the OR gate 83 and the wiper motor 10 changes its direction of rotation. In the reversing position the difference between the reading of the counter 30' and that of the counter 30 is 0, so that the comparator 70 carries positive potential at its output. Because positive potential is available at the circuit node 37 of the AND gate 64', the relay 61' of the other wiper motor is energized with reversed direction of rotation via the OR gate 73 and the AND gate 75 as well as the AND gate 64' and the OR gate 86, so that also this motor starts. This happens only when it has been ascertained by the decoder 36 that the wiper 12, whose angular position is symbolized by the counter reading of the counter 30, occupies the angular position 3 in the embodiment. Thus, decoder 36 determines that the wiper motor 10 starts first from the reversing position and the motor 11 is only started, when the wiper 12 driven by the motor 10 occupies a defined position.

If the motor 10 runs more quickly during the return than the motor 11, the difference determined by deducting the angular position of the wiper 12 from the angular position of the wiper 13 continues to be positive at the output of the difference stage 31. Both motors continue to run until they are switched off in the parking position of the wipers via a signal from the circuit nodes 41 or 41' and braked by short-circuit. If in contrast thereto it is assumed that the wiper 12 does not yet occupy the angular position 2 and in the meantime the wiper 13 enters the angular position 2, the value at the output of the difference stage 31 becomes negative.

Then the reading of the counter is still 3, while the reading of the counter 30' has the value 2. Thus the potential at the output of the comparator 70 jumps to ground and the OR gate 73 is blocked. Consequently the relay 61' is de-energized and the wiper 13 is braked. If, however, the wiper 12 reaches the angular position 2, the difference at the output of the difference stage 31 is no longer negative and the signal at the output of the comparator 70 changes again. Thus, the motor 11 is also switched on again. Altogether it is thereby ensured that a wiper cannot enter a wiping area which has not yet been left by the other wiper. Thus, a collision of the wipers is effectively prevented.

Now assume that during the reverse motion, the wiper 12 is blocked in the angular position 2. The other wiper 13 also occupies the angular position 2 at this time. Shortly after the wiper 12 has been blocked, the monostable multivibrator 50, which may be retriggered, is reset into its rest position so that positive potential may be measured at the circuit node 52. Thus, the memory 33 is set and reads the value 2 from the counter 30'. Furthermore, one input of the AND gate 53' is controlled. The other input of the AND gate 53' is also controlled, namely by the comparator 34', so that a reversing signal is released at the circuit node 48 via the OR gates 42', 54', the AND gate 45 and the OR gate 47. The switching stage 65 is brought into its other switching condition by this reversing signal via the delay element 77. In this switching position an advance signal is again available at the output 66. Thus relay 60' is energized and the motor 11 rotates in clockwise direction. In the reversing position, the wiper 13 is switched off via the end position signal on the lead 44'. Thus a reversing signal is again generated at the switching port 48 via the OR gate 55', the AND gate 46, whose other input is connected to positive potential via the OR gate 55, and the OR gate 47 and the switching condition of the switching stage 65 is again changed via the delay element 77. Because there is positive potential at one input of the OR gate 73 from the circuit point 52, the relay 61' is energized via the AND gate 75, the AND gate 64' and the OR gate 86 and thus the motor 11 is controlled in the other direction of rotation. The comparator 70 no longer controls the wiper still running as soon as the other wiper is blocked, because the OR gate 73 or 74 is then through-connected by the signals at the circuit node 52 and 52'. Now the wiper 13 moves again via the angular position 3 to the angular position 2. This movement is detected by the comparator 34', because the value 2 had been stored in the memory 33'. Thus a signal is released via the AND gate 53' which is equally effective to the signal released by the contact spring 27' in the parking position of the wiper 13. Thus the AND gate 64' is blocked and the relay 61' is de-energized. At the same time, a reversing signal is again released at the switching node 48, so that after a short period of time, the wiper motor 11 is started in the other direction of rotation. The result is that, if one wiper is blocked, the other wiper continues to operate, but the remaining wiper area is limited in a way that a collision between the moving wiper and the blocked wiper is prevented. This is achieved because memory 33' stores a value for the wiper 13, which value corresponds to the turning point of the parking position, and a switching signal for stopping the wiper and for reversing the direction of rotation is released via the comparator 34' when the wiper has reached the position stored. If the wiper 13 is blocked, a corresponding value is stored in the memory 33, which value limits the wiping area, and a respective signal is released via the AND gate 53, which signal is effective in the same way to that which would be released in the reversing position during undisturbed operation. The circuits differ in that in one case the AND gate 53 affects the potential at the circuit node 44 via the OR gate 42 and the inverter 43, while in the other case the potential at the circuit node 41' is controlled via the AND gate 53', the OR gate 42' and the inverter 40'.

The features of the invention will be emphasized again below with reference to the drawings. In a first part of the wiper motion in a wiper installation according to the invention, namely during the advance from the parking position to the reversing position, the motor 11 of the first wiper 13 is continuously switched on independently of the angular position of the two wipers and only the motor 10 of the second wiper 12 is energized in dependence on the difference of the angular positions of the two wipers. This can be seen from FIG. 3 that the advance signal of the switching stage 65 directly controls one motor 11 via the AND gate 63' and the relay 60', while this advance signal for the other motor 10 is interconnected with the output signal of the comparator 70 via the AND gate 76. During the other part of the wiper motion, namely during the return from the reversing position into the parking position, the motor 10 of the second wiper 12 is controlled independently of the angular positions of the two wipers by the return signal at the output 67 of the switching stage 65 via the AND gate 64, the OR gate 83 and the relay 61, whereas for the control of the other motor 11 this return signal is interconnected with the output signal of the comparator 70 via the AND gate 75.

The motors 10 and 11 are synchronized in the parking position and in the reversing position. This can be seen from the fact that each motor is switched off in the parking position or in the reversing position by an end position signal of its sensor via the contact springs 27 and 28 or 27' and 28'. The motor can only be started again, when the switching condition of the switching stage 65 changes. However, a change-over of this switching stage 65 is only effected, when it has been ascertained by means of the AND gates 45 and 46, that both wipers occupy their parking or their reversing position.

Before a wiping action is initiated, the angular position of the two wipers is checked. If they do not occupy the parking position, they are reset into the parking position one behind the other, so that there are defined initial conditions. As has been described above, this is achieved via the modules 80, 82, 84, 85 which directly affect the relays 61 and 61' via the OR gates 83 and 86, which relays control the return motion of the wipers.

In the parking position and in the reversing position, after the motors have been switched off, the wipers can run beyond their normal position up to an angle of 20° in dependence on the conditions of the window pane. For example, in the embodiment according to FIG. 1, the wiper 12 could run into the zone of the wiper 13 via the angular position 4, which zone of the wiper 13 begins at the angular position 3. If the wiper 12 were blocked in this position and the return motion of the wiper 13 would be initiated, the two wipers could collide and the wiper installation could be damaged thereby. In order to eliminate this trouble, the wiper 12 is earlier started from its reversing position than the wiper 13. Only if the wiper 12 has occupied a given angular position, can the wiper 13 begin to run. This is achieved by the decoder 36, which samples the reading of the counter 30 of the wiper 12 and blocks the AND gate 64', through which the other motor 11 is controlled, via the signal at the output 37.

The pendulum motion of the wipers is monitored so that, when one wiper is blocked, the motor of the other wiper is continued to be controlled and this wiper is driven in pendulum fashion in an angular area whose borders depend on the angular position of the blocked wiper. The supervision of the pendulum motion of the wipers is effected via the retriggerable monostable multivibrator 50 and 50'. The borders of the wiping area for the still running wiper are determined by storing a value in one of the memories 33 or 33'. At the time one wiper is blocked, this value corresponds to the angular position of the other wiper. In the present embodiment, the reversing position is varied with regard to the wiper 12, whereas with regard to the wiper 13, the parking position is varied in case of trouble and the reversing position is retained. This can be seen in the drawing by an interconnection of the signal of the AND gate 53 via the OR gate 42 with the signal of the contact spring 28 in one case, and, in the other case, by an interconnection of the signal of the AND gate 53' via the OR gate 42 with the signal of the contact spring 27'. In the embodiment, the border of the wiping angle area is determined by the position of the still running wiper at the time of the other wiper is blocked. During undisturbed operation, this position depends, however, on the position of the blocked wiper and it is ensured that the remaining wiping area across which the still running wiper moves does not extend into the area the blocked wiper occupies. In another embodiment, the angular position of the blocked wiper could also be sampled and the borders of the remaining wiping area could be determined in direct dependence thereon. An embodiment of this kind has the advantage that, under certain circumstances, the remaining wiping area is larger than that of the embodiment shown.

If both wipers are blocked all AND gates 63 and 64 or 63' and 64' are blocked by the signals at the circuit nodes 56 or 56'.

The switching stage which determines the direction of rotation of the motors 10 and 11 is triggered via a delay element 77. This has the advantage that the motors are reliably braked by short-circuit and stopped prior to being acted upon with a voltage of reversed polarity. However, one can also affect the mode of operation of the wiper installation via this delay element 77, for via the operating switches 87 and 88, the delay time of this delay element 77 can be affected. The motors 10 and 11 are laid out in a way that they run with a relatively high rotational speed which corresponds to the higher rotational speed of known two-stage wiper installations. If then only the operating switch 79 is switched off, the delay time of the delay element 77 shall be relatively long. The wipers are then stopped in the parking position and in the reversing position, so that as a result, the frequency of wiping substantially corresponds to that of conventional wiper installations with a slower rotational speed of the motor. If now the operating switch 87 is additionally actuated, the delay time of the delay element 77 is reduced, so that the result is a greater frequency of wiping. If, in addition to the operating switch 79, the operating switch 88 is also actuated, the delay time in the parking position is essentially longer than that in the reversing position. The result is a wiper operation which corresponds to the intermittent wiper operation of conventional wiper installations. In wiper installations with overlapping wiping areas particular zones are empirically determined in each wiping area in a way that one can say that one wiper can move across particular zones, when the other wiper occupies a particular zone, without having to fear a collision. These zones can have different angular areas. In the embodiment shown, the sensor has contact segments to release the pulses. The contact segments are also arranged at different angular distances from one another. Thus, a sensor of this kind cannot be universally used, because the wiping areas of wiper installations are different for different vehicle models. However, a sensor can be alternately used which releases a pull at regular angular distances, if the pulses are combined to pulse packages by electronic evaluation in a way that the counters 30 or 30' advance at any time the respective wiper crosses the border area of two zones. A sensor of this kind can be used for all wiper installations. However, the evaluation circuit is specific with regard to the vehicle model.

In the embodiment shown, the limit value, i.e., the minimum spacing between the two wipers 12 and 13 which must be reached in any case, is the same during advance and return motion. In particular wiper installations this limit value could also be different and therefore in FIG. 3 a lead to one input of the limit value memory 71 is conducted from the output 66 of the switching stage determining the direction of rotation. This lead shall symbolize that the limit value stored in this memory 71 may be changed over.

The embodiment has only been illustrated in the drawings so far as is absolutely necessary to understand it. The circuit diagrams of FIGS. 2 and 3 are only intended to show the processing of the sensor signals. In practice this circuit will not be built up with discrete units, but a microprocessor would preferably be used to which only the input signals of the sensors and of the operating switches have to be conducted and on which the control signals for the relays may be tapped off. If a microprocessor of this kind is used, the wiper operation can be very simply modified and improved with different software. Therefore, only a few examples of this approach will be described below as examples.

Figure 4:
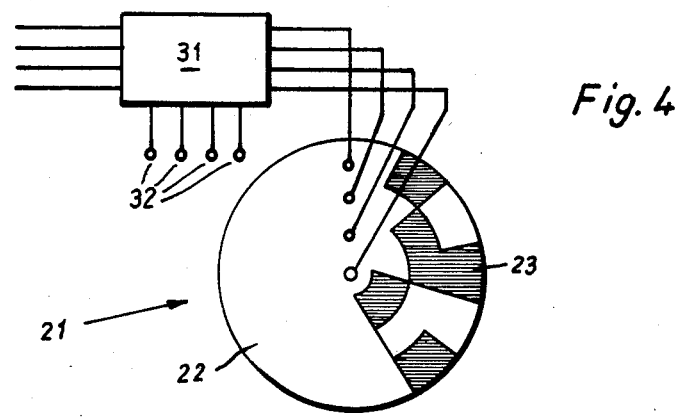
FIG. 4 is a schematic view of another sensor for detecting the angular position of the wipers.

If sensors according to FIG. 1 are used, the counter reading of the counters 30 and 30' has to be determined to a defined value at regular intervals, because the absolute angular position of the wipers cannot be detected by means of these sensors. It has to be taken in consideration that under certain circumstances due to an error caused by contact troubles, one of the necessary pulses is not conducted to the control device. This synchronization of the counter readings with the actual angular position of the wipers is achieved in the parking and/or in the reversing position. Alternatively sensors according to FIG. 4 can also be used which release a coded signal. Sensors of this kind are shown and therefore need not be described in detail. If a sensor of this kind is used, one can do without the counters 30 and 30', because the output signal of this sensor according to FIG. 4 could directly be conducted to the difference stage 31. The end position signals could in this case directly be derived from the sensor signal, so that the circuit arrangement is further simplified as a result.

Of course it is not absolutely necessary to use a sensor in which contact springs slide on corresponding contact paths. Moreover sensors can be conceived which are contactless, for example, opto-electronically operated sensors. In the embodiment shown it has been assumed that the switching disk rotates together with the wiper shaft, so that a direct correspondence between the position of the switching disk and the angular position of the wipers is provided. However, the switching disk could also be integrated into the motor and be coupled with the armature shaft in a manner protected against twisting, because the angle of rotation of the armature shaft, which acts upon the wiper shaft via a reduction gear, also provides a value for the angular position of the wipers.

In the embodiment shown, which comprises a reversible wiper motor, it could happen in the case of trouble that one wiper motor is not switched off in time. Thus, the wiper runs beyond an admitted area and for example, damages the body of the vehicle. This is prevented in the embodiment shown in that the supply voltage for the wiper motors 10 and 11 is conducted via the contact springs 29 and 29'. If one wiper leaves its admitted wiping area the motor is switched off simultaneously. Of course, the circuitry for an embodiment of this kind is complicated, but as far as operational reliability is concerned, it is especially advantageous. A solution would be simpler in which the supply voltage for the relays 60 and 61 or 60' and 61' would be controlled via the contact spring 29. This could be achieved in that the signal at the contact spring 29 is conducted to the AND gates 63 and 64 or 63' and 64'. However, the operational reliability of an embodiment of this kind is smaller, because the motor is not switched off if the relay contacts stick together. In systems of this kind mechanical stops can be additionally provided to limit the wiping angle. Furthermore, it is not absolutely necessary that this signal for switching off the motors in the case of trouble is tapped off the switching disk by a separate contact spring 29. It could be done without this additional contact spring 29, if for example, an overflow signal of the counters 30 and 30' is evaluated, which signal also characterizes that the wipers have left their admitted wiping area.

In the embodiment shown, the motors are switched off in the case of trouble. In improved systems of course, the rotational speed could be controlled in a way via a series resistor, a semiconductor correction device or a switching network that below a minimum spacing between the two wipers the lagging wiper moves slower. It is not absolutely necessary that a wiper motor with only one wiping speed is used and differing frequencies of wiping are achieved by varying the delay time of the delay element 77. The principle of the invention can also be utilized if motors with two pairs of brushes are used, which are accordingly controlled to vary the rotational speed.

Constant interval times for intermittent operation are provided in the embodiment described. The system can be further improved by making the interval times dependent on the condition of the window pane so that the interval times can be reduced when the window pane is wet and extended when the window pane is dry. In such a system, only the delay time in the parking position is varied, while the delay time in the reversing position is constant. Of course the delay times could also be varied in both end positions.

What is claimed is:

1. A windshield wiper assembly for motor vehicles comprising:
    two windshield wipers:
    two motors, each motor driving one of said two wipers in pendulum-fashion between a parking position and a reversing position;
    each motor comprising a sensor for detecting particular angular positions of the windshield wipers; and
    a control device to which the signals from each said motor sensor are conducted, said control device providing control signals for energizing and deenergizing said motors such that in a first wiping area the motor of a first one of said wipers is continuously energized independently of the angular positions of said two wipers and only the motor of the second of said two wipers is energized and deenergized in dependence on the angular position of both wipers.

2. A windshield wiper assembly according to claim 1, wherein said control device operates such that in a second wiping area the motor of said second wiper is continuously emergizes independently of the angular position of the two wipers and only the motor of said first wiper is controlled in dependence on the difference between the angular positions of the two wipers.

3. A windshield wiper assembly according to claim 2, wherein in said first wiping area said two wipers advance from said parking position into said reversing position, and in said second wiping area return into said parking position from said reversing position.

4. A windshield wiper assembly according to claim 3, wherein said control device further controls said motors such that when one of said two motors rotates its wiper to the parking or reversing position, said one motor is deenergized and continues to be deenergized until the other of said two motors drives its wiper to its parking or reversing position.

5. A windshield wiper assembly according to claim 1, wherein said control device checks the angular position of said two wipers before a wiping action is initiated and if said two wipers are one behind the other energizes at least one of said two motors to move said wipers into a defined initial position, preferably the parking position.

6. A windshield wiper assembly according to claim 5, wherein said control device switches one of said two motors on earlier than the other motor from the parking or reversing position.

7. A windshield wiper assembly according to claim 6, wherein one of said two motors is only started from the parking or reversing position, when the wiper of the other of said two motors occupies a predetermined angular position.

8. A windshield wiper assembly according to claim 1, wherein said control device senses when one of said two wipers is blocked and controls the motor of the other of said two wipers such that said wiper is driven in pendulum-fashion in an angular area the borders of which depend on the angular position of said blocked wiper.

9. A windshield wiper assembly according to claim 1, wherein each of said two motors is a reversible motor; said assembly further comprising first, second, third and fourth relays, said first and second relays in a rest position jointly short circuiting said first motor, said third and fourth relays in a rest position jointly short circuiting said second motor, said first relay in an operating position conducting a first voltage polarity to said first motor, said third relay in an operating position conducting said first voltage polarity to said second motor, said second relay in an operating position conducting a second voltage polarity to said first motor, said fourth relay in an operating position conducting said second voltage polarity to said second motor.

10. A windshield wiper assembly according to claim 9, wherein said control device comprises:
   a switching stage which alternatively releases advance and return signals characterizing the direction of motor rotation;
   a comparator which compares the difference between the angular positions of the two wipers with a predetermined limit value and releases an error signal when said limit value is not reached; and
   said control device releases switching signals for said first, second, third and fourth relays as follows:
   a. said first relay is energized by an advance signal,
   b. said second relay is energized by a return signal if no error signal appears,
   c. said third relay is energized by a return signal,
   d. said fourth relay is energized by an advance signal if no error signal appears, and
   e. energized ones of said first, second, third, and fourth relays are switched off at the end of the advance or return wiper movement when an end position signal is released by the wiper driven by the respective motor.

11. A windshield wiper assembly according to claim 10, wherein a reversing signal is provided for changing the switching condition of said switching stage when at the end of the advance or return movement of the two wipers an end position signal is released.

12. A windshield wiper assembly according to claim 11, wherein said control device comprises a delay network triggered by the end position signals for providing said reversing signal delayed in time.

13. A windshield wiper assembly according to claim 12, comprising: operating switches for selecting said delay time such that when said operating switches are in a first switching combination said delay time at the end of the advance or return movement is relatively long, when said operating switches are in a second switching combination said delay times are relatively short, when said operating switches are in a third switching combination said delay time at the end of the return movement is much longer than that at the end of the advance movement.

14. A windshield wiper assembly according to claim 9, comprising an ignition switch;
   said control device comprising a monitoring device activated when said ignition switch is switched on to release control signals for said first and third relays if said two wipers do not occupy their parking position, whereby said first relay is operated to energize said first motor to return its corresponding wiper to a parking position and said third is operated to energize said second motor only when the wiper of said first motor has returned into the parking position.

15. A windshield wiper assembly according to claim 9, wherein each said sensor provides signals dependent on the angular position of the wipers, said sensor signals being conducted to said control device;
   said control device comprising:
   a difference stage which determines the difference between the angular positions of said two wipers and provides an output signal;
   a memory; and
   a comparator for comparing said output signal with a predetermined value stored in said memory.

16. A windshield wiper assembly according to claim 15, wherein said control device comprises first and second counters; and
   wherein said sensors serve as pulse generators, the pulses of said pulse generators advancing the counts of said first and second counters, the output signals of said first and second counters being conducted to said difference stage, and in the parking position and or reversing position of said wipers said first and second counters are set to a predetermined value.

17. A windshield wiper assembly according to claim 15, wherein said sensors release signals coded in dependence on the angular position of said wipers, said coded signals being directly conducted to said difference stage.

18. A windshield wiper assembly according to claim 16 having overlapped wiping areas, each wiping area being divided into several zones;
   said sensors releasing signals at each beginning or end of a zone, said signals depending on the angular wiper positions; and
   wherein said predetermined value conducted to said comparator is selected such that a wiper can only enter a zone of its wiping area, when the other wiper has already left the zone overlapping with this zone.

19. A windshield wiper assembly according to claim 18, wherein each said sensor releases a pulse at each beginning or end of a zone.

20. A windshield wiper assembly according to claim 18, wherein said predetermined value is a first value during forward movement of the wipers and said predetermined value is a second value during the return movement of said wipers.

21. A windshield wiper assembly according to claim 15, wherein the sensor signal for one of said two wipers is stored in said memory as soon as the other of said two wipers is blocked;
   said control device comprising means for comparing said sensor signal stored in said memory with the angular-position-dependent sensor signal and releasing a switching signal of equal effectiveness with the end position signal of said one of said two wipers which is not blocked as soon as the stored signal corresponds to the angular-position-dependent signal.

22. A windshield wiper assembly according to claim 21, wherein said comparing means comprises first and second comparators, said first comparator releasing a switching signal of equal effectiveness to a parking position signal, and said second comparator releasing a switching signal of equal effectiveness to a reversing position signal.

* * * * *